United States Patent [19]

Völcker et al.

[11] Patent Number: 5,677,525
[45] Date of Patent: Oct. 14, 1997

[54] ANCILLARY MODULE FOR MAKING A SPATIALLY-RESOLVED MEASUREMENT OF A FOCUS VOLUME

[75] Inventors: Martin Völcker, Königsbronn-Zang; Robert Grub, Böbingen; Wolfgang Wörmann, Gerolsbach; Martin Gluch, Jena, all of Germany

[73] Assignee: Carl-Zeiss-Stiftung, Heidenheim, Germany

[21] Appl. No.: 605,954

[22] Filed: Feb. 23, 1996

[30] Foreign Application Priority Data

Feb. 23, 1995 [DE] Germany ............... 195 06 350.3

[51] Int. Cl.⁶ ......................................... G02B 27/40
[52] U.S. Cl. ................. 250/201.3; 250/234; 356/121; 356/124
[58] Field of Search ................. 250/201.3, 201.2, 250/227.26, 227.27, 234; 356/121, 124

[56] References Cited

U.S. PATENT DOCUMENTS

| 4,160,598 | 7/1979 | Fivester et al. ............... 356/121 |
| 4,965,441 | 10/1990 | Picard ............... 250/201.3 |
| 5,138,486 | 8/1992 | Meyer et al. ............... 359/363 |

FOREIGN PATENT DOCUMENTS

| 0487233 | 5/1992 | European Pat. Off. |
| WO94/16313 | 7/1994 | WIPO . |

OTHER PUBLICATIONS

"Confocal scanning light microscopy with high aperture immersion lenses" by G. J. Brakenhoff et al, Journal of Microscopy, vol. 117, Nov. 1979, pp. 219 to 232.

Primary Examiner—Edward P. Westin
Assistant Examiner—Alan L. Giles
Attorney, Agent, or Firm—Walter Ottesen

[57] ABSTRACT

The invention relates to an ancillary module 7 for making spatially resolved measurements of the focus volume of a light beam focussed by a microscope objective 4. The light beam is especially a laser beam. The invention includes a carrier assembly having a glass plate 8 and sleeves (9, 10) mounted thereon. A piezoelectric scanning tube 12 is held on the sleeves (9, 10) essentially perpendicularly to the glass plate 8. The scanning tube 12 operates to move an optical near-field probe 13a in three mutually perpendicular directions. The optical near-field sensor is preferably a glass fiber 13 which has a tip 13a at one end thereof. This tip 13a scans the laser focus volume. At the other end of the glass fiber 13, either a photodiode 14 is provided with which the light coupled into the glass fiber is detected or a corresponding light detector can be adapted by means of an interface. The two sleeves (9, 10) are displaceable relative to each other for coarsely positioning the scanning tube 12. In addition, position detectors (18a, 18b) for determining the deflection of the piezoelectric scanning tube 12 and luminescent diodes (17a, 17b) for illuminating the fiber tip 13a can be provided. The fiber tip 13a can be illuminated by the luminescent diodes and this tip can be observed for positioning the ancillary module 7 in the viewing field of the microscope 1.

25 Claims, 3 Drawing Sheets

ANCILLARY MODULE FOR MAKING A SPATIALLY-RESOLVED MEASUREMENT OF A FOCUS VOLUME

BACKGROUND OF THE INVENTION

In some areas of application of microscopy, it is desirable to obtain the most precise data possible with respect to the spatial intensity distribution of light in the focus of the microscope objective. Such an area of application is, for example, the fluorescent correlation spectroscopy which is described in detail in PCT patent publication WO 94/16313. In fluorescence correlation spectroscopy, individually occurring fluorescence events are detected in a very small volume of the laser focus with a confocal detector. In this measurement method, the size and form of the illumination volume, which is defined by the laser focus in the specimen, is very critical as is the size and form of the detected volume which is defined by the optical path of the confocal detector. The position of the detection volume relative to the illumination volume is also of significance. The determination of the measurement volumes often takes place with a computer based only on the optical data of the components mounted in the beam path. For this determination however, the optical data and the spacings of all components must be known and this is often not the case.

A method for determining the point transfer function of a confocal microscope is described in the article of G. J. Brakenhoff et al entitled "Confocal Scanning Light Microscopy with high Aperture Immersion Lenses", Journal of Microscopy, volume 117, (1979), pages 219 to 232. In this method, a pinhole diaphragm, which functions as the object, is moved along the optical axis in different planes by the laser focus and a spatially-resolved measurement of the light intensity incident upon the confocal detector is made. To apply this method however, a corresponding object table for the microscope is required which can be finely displaced in three spatial directions. Furthermore, the measurement results can easily become erroneous because of imaging errors in the detecting beam path.

Furthermore, for optical near-field microscopy, European patent publication 0,487,233 discloses that a microscopic object can be scanned with the sharp tip of a drawn optical fiber. The glass fiber tip is accommodated in a piezoelectric scanning tube for the scanning movement. The scanning tube permits movement of the glass fiber tip in three mutually perpendicular spatial directions. Images are here generated in two different ways; either the object is illuminated and the light, which is coupled into the glass fiber, is detected and used for image generation or, the object is illuminated via the glass fiber and the light, which is collected by a microscope objective, is used for image generation. Suggestions with respect to the spatially-resolved measurement of a focus volume are however not provided in this publication.

SUMMARY OF THE INVENTION

The invention provides a simple and cost effective ancillary module for microscopes which facilitates making a spatially-resolved measurement of a focus volume generated by a microscope objective.

The above object is realized by the ancillary module according to the invention. The ancillary module of the invention is for making a spatially-resolved measurement of a focus volume generated by an objective of a microscope having an object stage. The objective defines an optical axis and the ancillary module includes: a carrier assembly for placement on the object stage; an optical near-field probe for facilitating the spatially-resolved measurement of the focus volume; a positioning unit for holding the near-field probe and being mounted on the carrier assembly; and, the positioning unit including a fine positioning device for finely positioning the probe in two mutually perpendicular spatial directions relative to the carrier assembly within the focus volume.

In addition, it is an object of the invention to provide methods for measuring illumination volumes and/or detection volumes. It is also an object of the invention to provide a point image transfer function of microscopes or other optical imaging systems.

One embodiment of the method of the invention is for making a spatially-resolved measurement of a focus volume of a laser beam focussed by a microscope objective. The method includes the steps of: providing a positioning unit movable in three mutually perpendicular spatial directions and holding an optical near-field probe; utilizing the positioning unit to move the optical near-field probe through the focus volume to couple light in the focus volume into the optical near-field probe at positions within the focus volume; detecting the intensity of the light coupled into the optical near-field probe at respective ones of the positions of the probe in the focus volume; and, computing the focus volume from the detected light intensities at the positions, respectively, within the probe.

The invention especially permits measurements to be made of a laser focus volume generated by a microscope objective when this laser focus volume is disposed in a liquid and/or close to a cover glass and also when an immersion liquid is disposed between the cover glass and the focus volume. In this way, foci can be measured under realistic conditions with the media provided for the image generation.

The ancillary module of the invention includes a carrier assembly which is configured for placement on or next to the object table of a microscope. A positioning unit is mounted on this carrier assembly. The positioning unit permits a fine positioning relative to the carrier in three mutually perpendicular spatial directions. An optical near-field probe is mounted on the positioning unit.

An example of the above probe is a glass fiber drawn to form a tip at one end and a light detector at the other end or a glass fiber having a tip at one end and an adapter for a light detector at the other end. The last example affords the advantage that, in lieu of the light detector, a glass fiber provided with illumination can be connected to the ancillary module. The ancillary module can also be utilized as a point-shaped light source, for example, to measure the detected volume.

The ancillary module of the invention has a very simple configuration and can be mounted on or adapted to a microscope table which is already provided. The optical near-field probe or the tip of the glass fiber is brought into the focus of the microscope objective and thereafter is moved through the laser focus volume with the positioning unit. The light, which is detected at the particular position within the focus volume by the light detector, is recorded and, in correspondence to the movement of the fiber tip, is stored in a computer in the form of a two or three dimensional data field. From this set of data, one, two or three dimensional sections or the entire set of data can be displayed as desired on a monitor or can be applied to compute the volume of the focus.

The invention is based upon the positive experiences with sharply tipped glass fibers in the optical near-field microscopy. In this context, it is especially useful that the glass fiber tip has a very small aperture of only several ten nm and, in each case, only the light from a correspondingly small aperture region is coupled into the glass fiber tip and reaches the detector. Only that light can be detected which is coupled into the glass fiber. Accordingly, no imaging errors can have a negative effect. In an especially advantageous embodiment, the interposition of an imaging optic between the glass fiber tip and the light detector is avoided which, in turn, reduces complexity.

The carrier assembly of the ancillary module can include a base plate to which the optical axis of the microscope objective and to which the optical axis of the glass fiber are essentially perpendicular. The base plate has a marking coaxial to the optical axis in the center position of the positioning unit. The base plate can especially have the dimensions of a conventional object carrier so that the ancillary module can be clamped tightly to the object table of the microscope with a conventional object holder. The concentric marking provides for a simple coarse positioning of the ancillary module relative to the focus volume of the microscope objective. The markings of the base plate can be engraved lines when the base plate is made from glass or another transparent material.

It is especially advantageous when the base plate has a hole extending therethrough. The optical near-field probe or the glass fiber tip can be driven into this hole by means of the positioning unit so that the measurement of the focus volume takes place in the hole and the base plate therefore does not cause the focus volume to become erroneous.

If a focus volume is to be measured after passing through a cover glass, then the cover glass can be applied from below to the base plate. Here, the probe can be driven to the desired spacing relative to the cover glass by means of the positioning unit. Immersion liquid can be introduced between the cover glass and the objective. The liquid on the cover glass can be put into the hole with the probe for measuring the focus volume directly in the liquid.

In addition to the positioning unit, means should be provided for coarsely positioning the optical near-field probe in the direction of the optical axis of the microscope objective which is, at the same time, the axis of the glass fiber. The carrier assembly can comprise a base plate and two sleeves in order to make such a coarse positioning possible. The one sleeve is attached to the base plate and the positioning unit is mounted on the second sleeve. The two sleeves can be axially displaced relative to each other to provide coarse positioning. The mechanism for providing the axial displacement can, for example, be a set of threads formed on the sleeves.

In a further advantageous embodiment, the carrier assembly is also provided with illuminating means such as luminescent diodes for illuminating the optical near-field probe and especially the tip of the glass fiber. In this way, the probe can more easily be introduced into the depth of field region of the microscope objective in that the probe can be sharply adjusted while viewing into the microscope ocular.

In a simple embodiment of the ancillary module of the invention, the movement of the positioning unit is calibrated simply via the current or voltage signals applied to the positioning unit. However, to satisfy high requirements as to accuracy, capacitive, inductive or optical distance sensors can be provided in lieu thereof on the carrier assembly of the ancillary module.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
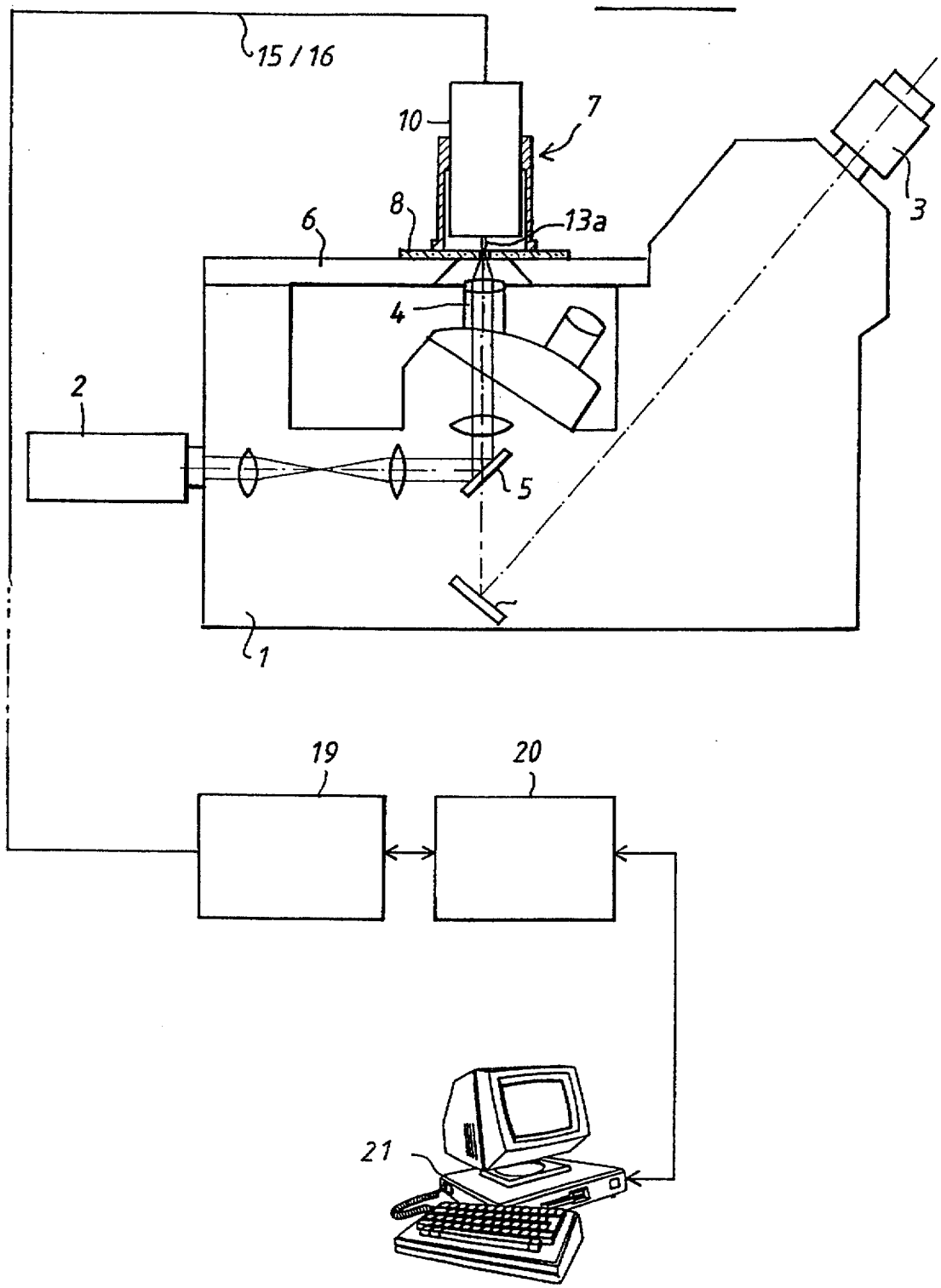
FIG. 1 is a schematic of an inverse microscope equipped with an ancillary module according to the invention.

In FIG. 1, a conventional inverse microscope such as the AXIOVERT microscope of Carl Zeiss is identified by reference numeral 1. The specific optical configuration of the microscope 1 is, for example, described in U.S. Pat. No. 5,138,486 incorporated herein by reference.

The object table 6 is arranged above the objective 4 which is in the beam path. The ancillary module 7 of the invention is positioned on the object table 6 and a conventional object holder (not shown) holds the ancillary module on the object table.

A conventional laser is identified by reference numeral 2 and has a laser beam coupled into the microscope beam path at the back end of the microscope. The laser beam is first expanded so that it fills out the pupil of the objective 4 after deflection at the splitter mirror 5. The laser beam is diffraction-limited focused by the objective 4.

For measuring the laser focus volume, the laser focus volume is scanned with the optical near-field probe in several planes perpendicular to the optical axis of the microscope objective 4 and, for each measurement, the detected signal intensity is determined and recorded. The control of the movement of the probe (glass fiber tip 13a), the measurement value detection and the display of the measurement value all take place by means of a computer 21 via a special interface 19. The spatially-resolved measured intensity values are stored in a memory 20 of the computer 21 as a 3D-data field. Any desired one or two dimensional sections through the 3D-data field can be displayed on a monitor via a corresponding graphic program and a special evaluation software. Furthermore, it is also possible to display the entire data field, for example, on the monitor as a color display wherein the colors are indicative of a particular variable such as light intensity. A further special evaluation software makes it possible to compute the volume of the laser focus in that, for example, the volume enclosed by those measuring points is computed in which the measurement value is more than a predetermined portion, for example, approximately $1/e^2$ of the maximum intensity signal.

Figure 2:
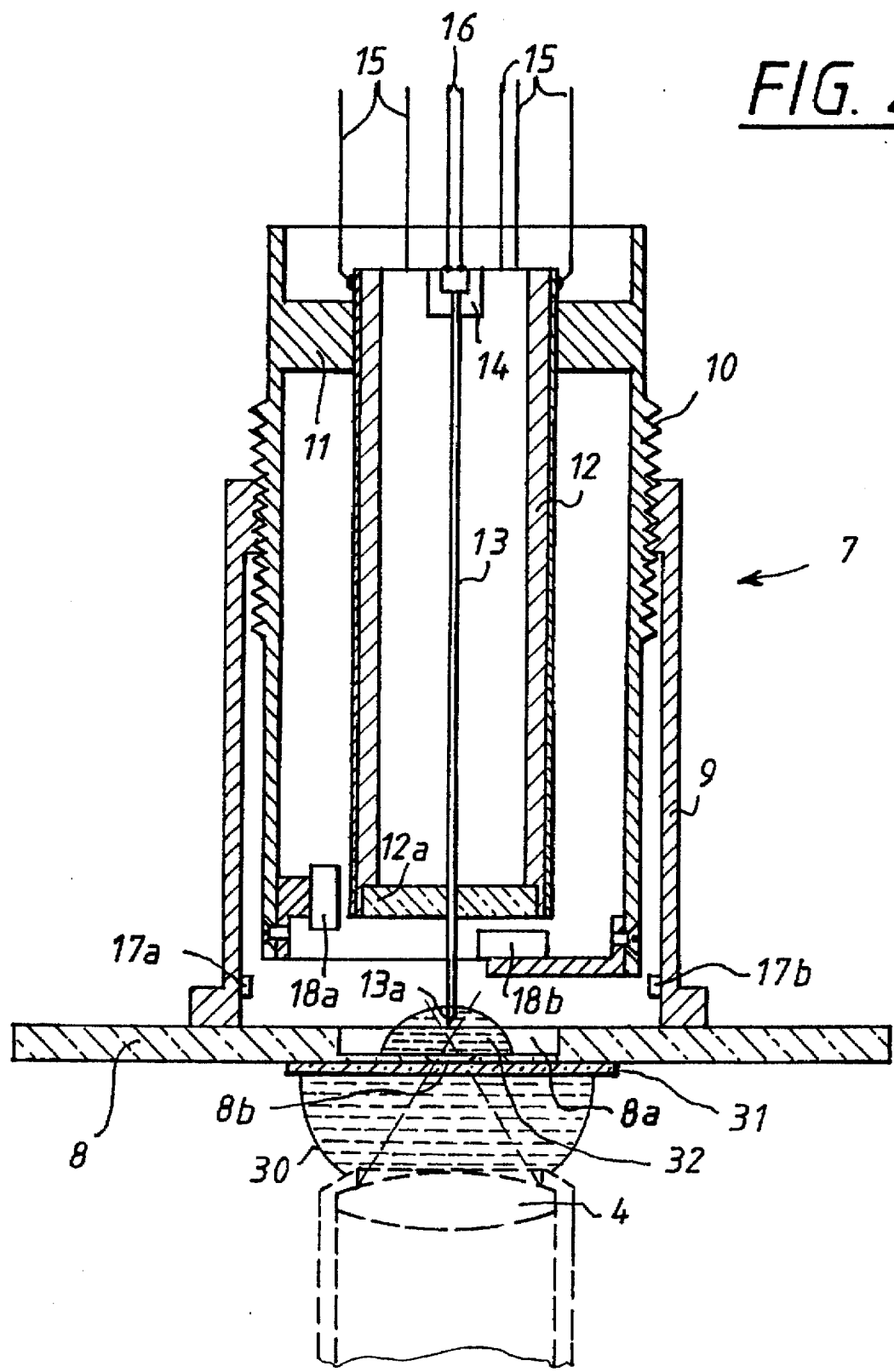
FIG. 2 is an enlarged detail view of the ancillary module.

The detailed configuration of the ancillary module is shown in FIG. 2. The carrier assembly of the ancillary module 7 comprises a carrier plate 8 and two cylindrical components (9, 10). The carrier plate 8 is, for example, made of glass or metal and corresponds with respect to its dimensions to a standard object slide having edge dimensions of approximately 76 mm×26 mm×1 mm. The carrier plate 8 has a recess 8a in the side thereof facing away from the objective 4. The recess is approximately in the center of the carrier plate 8 and a hole 8b is provided at the center of this recess. The hole 8b extends through the carrier or base plate 8 and has a diameter of 1 mm. The objective 4 and the laser beam focussed by the objective 4 are shown by broken lines in FIG. 2 because they are not part of the ancillary module.

The first cylindrical component 9 is coaxial to the hole 8b and is releasably attached to the base plate 8. The hole 8b can be easily filled with liquid 32 or be cleaned to remove the liquid by removing the component 9 from the base plate 8. The second cylindrical part 10 is connected to the first cylindrical part 9 and is axially displaceable with respect thereto by means of a fine thread. In this way, the second cylindrical part 10 can be rotated relative to the first cylindrical part 9 and can be simultaneously recessed more or less in the first cylindrical part. This is a very simplified solution. Other axial position drives and guides are available to those skilled in the art. The piezoelectric scanning tube 12 is accommodated on the second cylindrical part 10 via a holding ring 11. The piezoelectric scanning tube 12 comprises, in a manner known per se, several separately drivable electrodes on the outer side of the piezoelectric scanning tube. Depending upon to which electrode a high voltage is applied, the scanning tube is deformed in such a manner that the forward end 12a thereof can move in three mutually perpendicular spatial directions. Within the scanning tube, a glass fiber 13 is arranged having a sharp drawn tip 13a. The tip 13a is at the end of the glass fiber facing toward the objective 4. The glass fiber 13 then defines a known optical near-field probe. Other examples are known, for example, metal vaporized silicon nitride fragment tips.

A photodiode 14 as a light detector is mounted at the opposite end. The photodiode 14 can be disposed within the ancillary module or outside thereof. In the latter case, the fiber serves also as a signal line and the photodiode is accommodated at the interface 19. With a movement of the forward end 12a of the scanning tube, the tip 13a of the glass fiber 13 follows the movement of the scanning tube and carries out a movement in three mutually perpendicular spatial directions in correspondence to the forward end 12a of the scanning tube 12 in dependence upon the applied voltage.

Position detectors (18a, 18b) are provided at the second cylindrical part 10 for calibrating the movement of the scanning tube 12. The position detector 18b measures the deflection of the scanning tube 12 along the axis of the fiber 13 and the position detector 18a measures the position of the tip 12a of the scanning tube 12 in a direction perpendicular to the axis of the glass fiber 13. A third position detector (not shown) measures the deflection perpendicular to the plane of the drawing in FIG. 2.

Two luminescent diodes (17a, 17b) are mounted on the first cylindrical part 9 and serve for simply positioning the ancillary module relative to the laser focus volume.

The adjustment of the ancillary module relative to the laser focus volume takes place as follows: first, the desired spacing of the tip 13a of the glass fiber 13 above the hole 8b in the base plate is adjusted by rotating the second cylindrical part 10 with respect to the cylindrical part 9. The adjustment of the ancillary module 7 and the tip 13a of the glass fiber 13 relative to the laser focus volume takes place with the mechanical stage of the microscope in such a manner that the hole 8b of the base plate 8 is coincident with the laser focus volume. The hole 8b then serves as a marking and can be viewed via holes (not shown) in the first cylindrical part 9. Thereafter, and while viewing in the ocular tube 3 of the microscope, the focus drive of the microscope is adjusted to sharply focus on the tip 13a of the glass fiber 13 and the fiber tip 13a is brought into the center of the viewing field by readjusting the mechanical stage. The luminescent diodes (17a, 17b) are switched on for viewing the fiber tip 13a through the ocular tube of the microscope so that the fiber tip 13a is illuminated. In this way, the ancillary module is adjusted and the laser focus volume can be measured in that different voltages are applied to the control lines 15 for the scanning tube and, for each applied voltage, the signal, which is detected by the photodiode 14, is registered via the output lines 16. For measuring the focus volume of high-magnifying objectives, it can be necessary to first carry out the above method with an objective having a lesser magnification in order to adjust the ancillary module relative to the beam path of the microscope. Thereafter, an exchange is made of the measuring objective and the near-field probe is again adjusted in the image center and the focus plane of the measuring objective.

A cover glass 31 can be arranged at the lower side of the carrier plate 8. Likewise, an immersion liquid 30 can be provided between the microscope objective 4 and the cover glass 31 and a liquid drop 32 can be arranged between cover glass 31 and the optical near-field probe 13. These elements (30, 31, 32) are selected and arranged depending upon the recording conditions for a subsequent microscopic recording for which the laser focus volume is calibrated. Also, as may be required, the elements are selected only in part, for example the cover glass 31 and the liquid drop 32 without the immersion liquid 30. The tip 13a of the near-field probe 13 can also be dipped into the liquid drop 32 on the cover glass 31.

Figure 3:
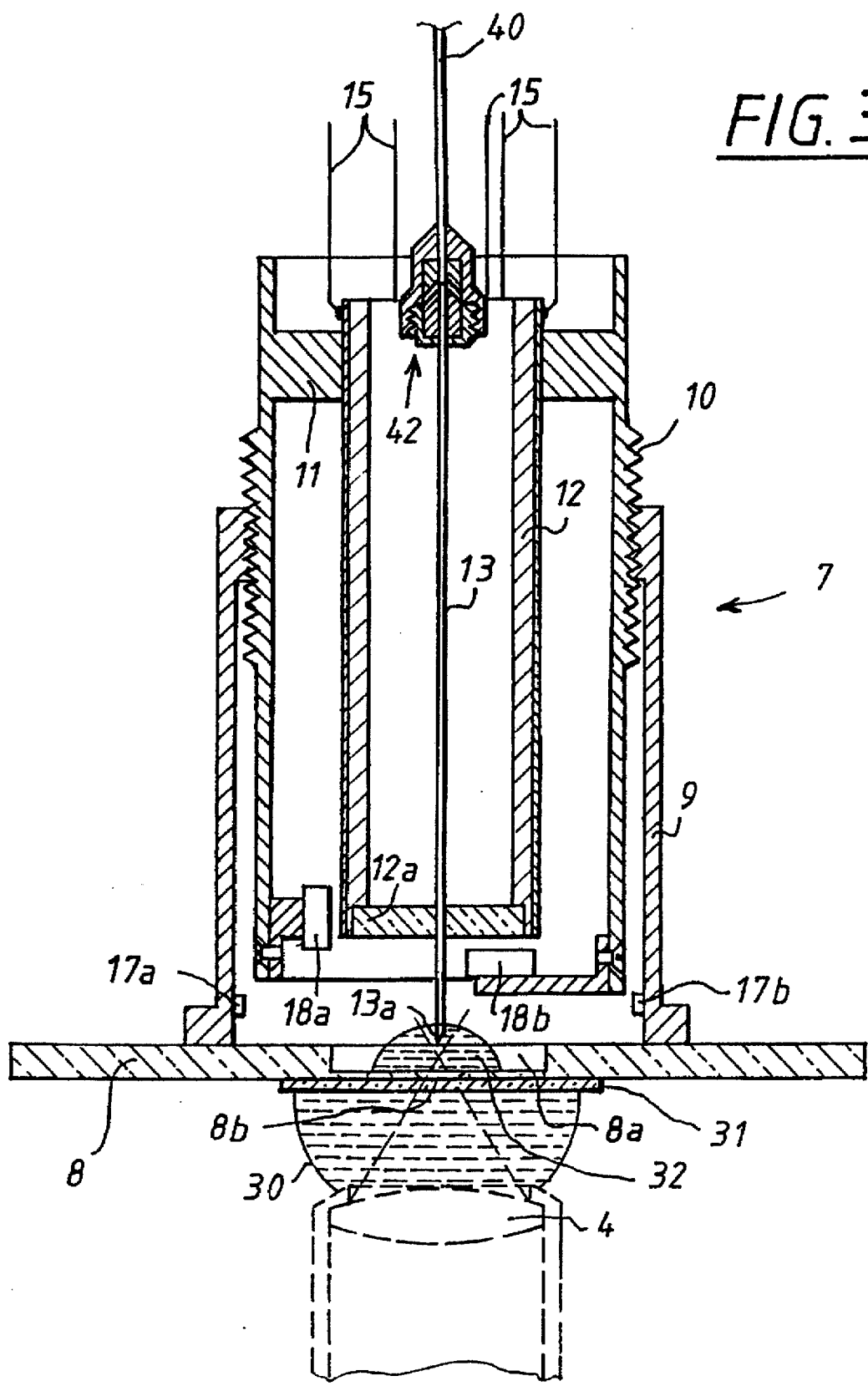
FIG. 3 is an enlarged detail view of an alternate embodiment, of the ancillary module according to the invention.

The embodiment shown in FIG. 3 includes essentially the same configuration as the embodiment of FIG. 2. In lieu of a light detector, an interface 42 can, however, be provided at the end of the glass fiber 13 facing away from the fiber tip 13a. A light detector can then be seated on the interface 42. In this embodiment, the applicability of the ancillary module is increased because the light of a fiber illumination can be coupled into the fiber 13 of the ancillary module. The fiber of the fiber illumination is identified by reference numeral 40.

The fiber tip 13a acts as a point-shaped light source when light is coupled into the ancillary module. If the light exiting from the fiber tip 13a and entering into the microscope objective 4 is subsequently detected, then the detection volume of the microscope can be measured by evaluating the light intensity detected as a function of fiber position. In this application of the ancillary module, a two or three dimensional data field of the focus volume, which is detected by the microscope objective 4, can be recorded.

The detector, which is required for the detection of the light, can, for example, be adapted to an interface of the microscope (not shown in FIG. 1), which functions to connect a camera. By connecting a CCD-camera to such an interface, the output signals of the camera can be applied for measuring the image of the point-shaped light source formed by the near-field probe. It is also possible to scan the image space of the microscope with a further near-field probe and a detector connected thereto in order to measure the above-mentioned point image with a higher resolution. A six-dimensional data field is generated by moving the fiber tip 13a in three orthogonal spatial directions in the object space in combination with a movement of the near-field probe in three orthogonal spatial directions in the image space. The point image transfer function of the optic arranged between the object space and the image space can be determined from this data field.

If, in contrast, the ancillary module is utilized in combination with a confocal arrangement (such as a laser scan microscope or a fluorescence-correlation spectrometer), then the confocal detectors, which are anyway present, can be applied in order to record a two-dimensional or three-dimensional data field of the detection volume generated by the microscope objective 4 and by the confocal detector.

During a scanning of the image space with a near-field probe, a partial beam path can be coupled out of the glass fiber forward of the illuminating end fiber tip via a fiber coupler into a reference beam path and can again be coupled in after passing through an optical path length of the same length parallel to the detection beam path in the near-field probe of the image space with a second fiber coupler. The light coupled into the tip of the near-field probe of the image space then interferes with the light of the reference beam path. From the interference signal, information is obtained as to the phase behavior of the light in the viewing beam path of the microscope or as to the phase behavior of the point image function.

The interface position is provided directly at the ancillary module in the embodiment thereof shown in FIG. 3. An alternate embodiment is also possible wherein the glass fiber 13 is configured so as to be longer (for example, with a length of 1 m) and the interface is provided in the form of a commercially available fiber holder at the end of the glass fiber.

As an alternative to the embodiments shown in FIGS. 2 and 3 and in lieu of the manual coarse positioning, a motorized positioning drive can also be provided, for example, in the form of a plunger coil motor having a position detector. In this case, the fine positioning in the axial direction can also take place via the motorized position drive so that the scanning tube 12 functions only for the positioning and/or to scan in the two directions perpendicular to the optical axis.

In the embodiments shown in the drawing, the ancillary module has only a single near-field probe. It is also possible to arrange several near-field probes parallel to each other in the ancillary module. These near-field probes then can be moved synchronously with respect to each other depending upon the drive of the scanning tube 12.

FIG. 1 shows the use of the ancillary module in combination with an inverse microscope. It is however also possible to accommodate the ancillary module on an upright microscope, for example, on the lower side of the object table. Attention must then however be given to measurements in liquids so that the liquid drop does not flow into the sensor.

It is understood that the foregoing description is that of the preferred embodiments of the invention and that various changes and modifications may be made thereto without departing from the spirit and scope of the invention as defined in the appended claims.

What is claimed is:

1. An ancillary module for making a spatially-resolved measurement of a focus volume generated by an objective of a microscope having an object stage, the objective defining an optical axis and the ancillary module comprising:
    a carrier assembly which is attachable to said object stage;
    a positioning unit mounted on said carrier assembly;
    an optical near-field probe mounted to said positioning unit; and,
    wherein said positioning unit is configured to facilitate a fine positioning of said optical near-field probe in two mutually perpendicular spatial directions relative to said carrier assembly within said focus volume.

2. The ancillary module of claim 1, said near-field probe being a glass fiber having a tip movable within said focus volume.

3. The ancillary module of claim 1, said carrier assembly including a base plate essentially perpendicular to said optical axis; and, said base plate having a marking coaxial to said optical axis.

4. The ancillary module of claim 3, said base plate having a lower side and having a hole formed therein on said optical axis; and, said marking being formed on said lower side.

5. The ancillary module of claim 4, said carrier assembly further including a displacing device facilitating a displacement of said positioning unit along said optical axis to coarsely position said positioning unit and said near-field probe relative to said focus volume.

6. The ancillary module of claim 5, said displacing device including a first sleeve connected to said base plate; a second sleeve holding said positioning unit therein; and, an interface mechanism between said sleeves for permitting said second sleeve to be displaced along said optical axis relative to said first sleeve.

7. The ancillary module of claim 1, said carrier assembly including luminescent devices positioned to illuminate said near-field probe.

8. The ancillary module of claim 7, said luminescent devices being respective luminescent diodes.

9. The ancillary module of claim 1, said carrier assembly including distance sensors facilitating a detection of the position of said near-field probe.

10. The ancillary module of claim 1, said near-field probe having an aperture of less than 200 nm.

11. The ancillary module of claim 1, said near-field probe having an aperture of less than 100 nm.

12. The ancillary module of claim 1, said optical near-field probe including a light detector for detecting light coupled from said focus volume into said near-field probe.

13. The ancillary module of claim 12, further comprising an interface mounted in said positioning unit for accommodating said light detector therein.

14. The ancillary module of claim 1, further comprising an interface for coupling of light into said near-field probe.

15. A method for making a spatially-resolved measurement of a focus volume of a laser beam focussed by a microscope objective, the method comprising the steps of:
    providing a positioning unit movable in three mutually perpendicular spatial directions and holding an optical near-field probe;
    utilizing said positioning unit to move said optical near-field probe through said focus volume to couple light in said focus volume into said optical near-field probe at positions within said focus volume;
    detecting the intensity of said light coupled into said optical near-field probe at respective ones of said positions of said probe in said focus volume; and,
    computing said focus volume from the detected light intensities at said positions, respectively, within said probe.

16. The method of claim 15, said optical near-field probe having an aperture equal to or less than 200 nm.

17. The method of claim 15, said optical near-field probe having an aperture equal to or less than 100 nm.

18. The method of claim 15, wherein said near-field probe and said microscope objective conjointly define a space therebetween; and, a medium is provided in said space when said focus volume is measured.

19. The method of claim 18, wherein said near-field probe and said microscope objective conjointly define a space therebetween; a cover plate is provided in said space; an immersion liquid is interposed between said microscope objective and said cover plate; and/or, a liquid drop is provided in said focus volume.

20. A method for making a measurement of a focus volume of the beam path of a microscope having an objective defining said focus volume, the method comprising the steps of:
    providing an optical near-field probe defined by a glass fiber having a tip at one end thereof and providing a positioning unit movable in three mutually perpendicular spatial directions with said glass fiber being held by said positioning unit;

utilizing said positioning unit to move said tip through said focus volume of said objective;

coupling light into said glass fiber;

detecting the light out-coupled through said tip and collected by said objective at positions of said tip in said focus volume; and, computing said focus volume in dependence upon the light intensities at corresponding ones of said positions.

21. The method of claim 20, said optical near-field probe having an aperture equal to or less than 200 nm.

22. The method of claim 20, said optical near-field probe having an aperture equal to or less than 100 nm.

23. The method of claim 20, wherein said near-field probe and said microscope objective conjointly define a space therebetween; and, a medium is provided in said space when said focus volume is measured.

24. The method of claim 23, wherein said near-field probe and said microscope objective conjointly define a space therebetween; a cover plate is provided in said space; an immersion liquid is interposed between said microscope objective and said cover plate; and/or, a liquid drop is provided in said focus volume.

25. A method for measuring the point image transfer function of a beam path of a microscope defining an object space, the method comprising the steps of:

providing an optical near-field probe defined by a glass fiber having a tip at one end thereof and providing a positioning unit movable in three mutually perpendicular spatial directions with said glass fiber being held by said positioning unit;

utilizing said positioning unit to move said tip through said object space;

coupling light into said glass fiber and coupling said light out through said tip and transmitting said light via said optical system;

detecting said light transmitted by said optical system at positions in an image space of said object space utilizing a second optical near-field probe likewise movable in three mutually perpendicular directions;

recording a six-dimensional data field from the light intensities in dependence upon said positions; and, computing said point image transmission function from said six-dimensional data field.

* * * * *